United States Patent
Yokoyama et al.

(10) Patent No.: US 7,886,521 B2
(45) Date of Patent: Feb. 15, 2011

(54) DIAGNOSIS DEVICE OF EXHAUST PURIFICATION CATALYST

(75) Inventors: Masakuni Yokoyama, Tokai (JP); Jyun Kawamura, Chita-gun (JP)

(73) Assignee: Denso Corporation, Kariya (JP)

( * ) Notice: Subject to any disclaimer, the term of this patent is extended or adjusted under 35 U.S.C. 154(b) by 644 days.

(21) Appl. No.: 11/976,081

(22) Filed: Oct. 19, 2007

(65) Prior Publication Data
US 2008/0092524 A1   Apr. 24, 2008

(30) Foreign Application Priority Data
Oct. 20, 2006   (JP)   ............... 2006-285694

(51) Int. Cl.
*F01N 3/00* (2006.01)
(52) U.S. Cl. .................. 60/277; 60/286; 60/297; 60/301; 60/303
(58) Field of Classification Search .......... 60/274, 60/277, 286, 297, 301, 303, 295
See application file for complete search history.

(56) References Cited

U.S. PATENT DOCUMENTS

| | | | |
|---|---|---|---|
| 5,483,795 A | | 1/1996 | Katoh et al. |
| 6,499,291 B2 * | | 12/2002 | Lang et al. ............... 60/277 |
| 6,651,422 B1 * | | 11/2003 | LeGare ................... 60/277 |
| 6,755,013 B2 * | | 6/2004 | Uchida ................... 60/277 |
| 6,877,311 B2 * | | 4/2005 | Uchida ................... 60/277 |
| 6,892,528 B2 * | | 5/2005 | Okada et al. ............. 60/277 |
| 6,925,796 B2 * | | 8/2005 | Nieuwstadt et al. ....... 60/277 |
| 7,533,518 B2 * | | 5/2009 | Kurtz et al. ............. 60/285 |

FOREIGN PATENT DOCUMENTS

| | | |
|---|---|---|
| JP | 9-287436 | 11/1997 |
| JP | 2005-171802 | 6/2005 |
| JP | 2005-282435 | 10/2005 |

OTHER PUBLICATIONS

Japanese Office Action dated Nov. 24, 2010 issued in corresponding Japanese Application No. 2006-285694 with English Translation.

* cited by examiner

*Primary Examiner*—Binh Q. Tran
(74) *Attorney, Agent, or Firm*—Nixon & Vanderhye PC (57) ABSTRACT

An exhaust purification catalyst diagnosis device for diagnosing a degree of performance degradation of a NOx catalyst, which is provided in an exhaust system of an engine for exhaust purification, has a program that determines whether temperature of the NOx catalyst is within a predetermined diagnosis permission range before catalyst diagnosis processing and a program that controls the temperature of the NOx catalyst into the diagnosis permission range before the catalyst diagnosis processing if it is determined that the temperature of the NOx catalyst is outside the diagnosis permission range. Thus, the exhaust purification catalyst diagnosis device can perform the catalyst diagnosis processing frequently with high reliability and high accuracy, while maintaining suitable emission.

15 Claims, 7 Drawing Sheets

DIAGNOSIS DEVICE OF EXHAUST PURIFICATION CATALYST

CROSS REFERENCE TO RELATED APPLICATION

This application is based on and incorporates herein by reference Japanese Patent Application No. 2006-285694 filed on Oct. 20, 2006.

BACKGROUND OF THE INVENTION

1. Field of the Invention

The present invention relates to a diagnosis device of an exhaust purification catalyst such as a NOx occlusion reduction catalyst.

2. Description of Related Art

In recent years, a device using a NOx occlusion reduction catalyst, i.e., a NOx catalyst, has been gathering attention as one of exhaust purification devices for purifying NOx (nitrogen oxides) contained in exhaust gas. The NOx catalyst used in the device consists of an alkaline earth material (occlusion material) and platinum, for example. The NOx catalyst has characteristics of occluding the NOx in the exhaust gas when the atmosphere of the exhaust gas is a lean air fuel ratio (i.e., air fuel ratio corresponding to fuel ratio lower than that of stoichiometric air fuel ratio) and of reducing and removing the occluded NOx with reduction components such as HC and CO contained in the exhaust gas when the air fuel ratio is rich (i.e., air fuel ratio corresponding to fuel ratio higher than that of stoichiometric air fuel ratio). This device uses such the characteristics of the catalyst. The device purifies the NOx contained in the exhaust gas and reduces the NOx emission quantity by repeating the occlusion and the reduction (discharge) of the NOx with the catalyst.

However, also in such the device, there is limitation in the occlusion capacity of the NOx catalyst. Therefore, if the catalyst is continuously used in the environment where the NOx reduction quantity (NOx discharge quantity) exceeds the NOx occlusion quantity and the NOx occlusion quantity approaches the occlusion limitation, the NOx purifying performance of the catalyst falls significantly. Therefore, conventionally, as processing (catalyst recovery processing) for recovering from the lowering of the NOx purifying performance (temporary performance degradation corresponding to NOx occlusion quantity), reduction removal of the NOx occluded in the NOx catalyst is performed periodically. For example, a diagnosis device of an exhaust purification catalyst that diagnoses a degree of performance degradation (for example, existence or nonexistence of sulfur poisoning) of a NOx catalyst resulting from a sulfur component (S) and the like contained in engine fuel and the like during catalyst recovery processing is also known, for example, as described in Japanese Patent Gazette No. 2692380. Next, with reference to FIG. 9, an outline of the catalyst diagnosis processing currently performed by conventional and general devices including the above-described device will be explained. In order to perform recovery and diagnosis of the NOx catalyst provided in an engine exhaust system, the device provides a LNT (Lean NOx Trap) system that makes an air fuel ratio rich temporarily to reduce the occluded NOx by performing oversupply of the fuel for combustion (i.e., by performing rich purge). Here, an example in which the device is applied to an exhaust purification system for a vehicular diesel engine that performs steady operation by lean combustion will be explained.

Figure 9:
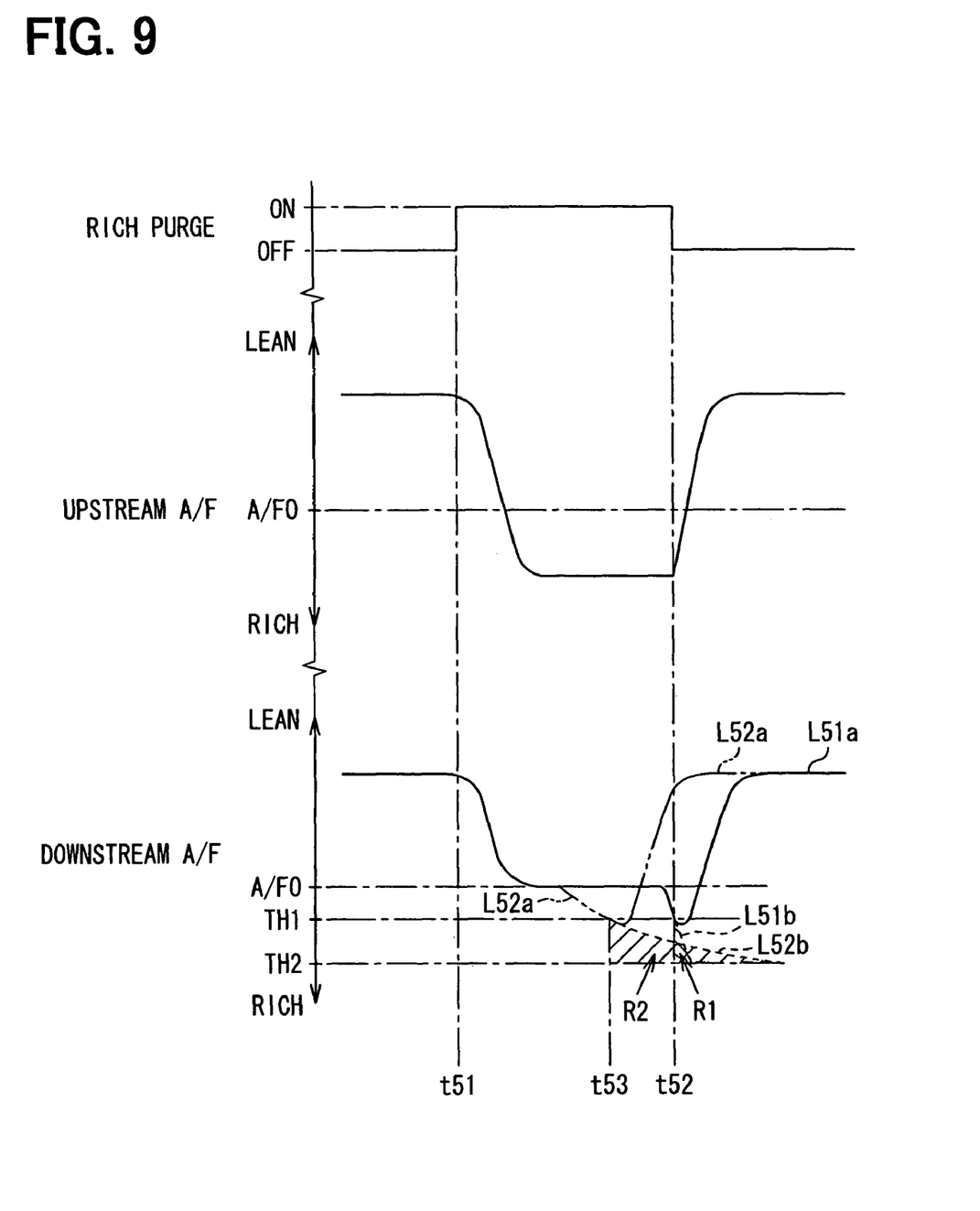
FIG. 9 is a time chart showing a processing mode of catalyst diagnosis processing performed by an exhaust purification catalyst diagnosis device of a related art.

FIG. 9 is a timing chart showing whether the rich purge is performed and the air fuel ratios A/F (equivalent to oxygen concentrations in exhaust gas) upstream and downstream of the NOx catalyst with respect to a flow direction of the exhaust gas. The upstream air fuel ratio A/F (oxygen concentration) and the downstream air fuel ratio A/F (oxygen concentration) can be sensed respectively, e.g., with A/F sensors (oxygen concentration sensors) provided upstream and downstream of the NOx catalyst with respect to the flow direction of the exhaust gas.

The device performs the rich purge as the catalyst recovery processing periodically (i.e., at each elapse of predetermined time). That is, for example, as shown in FIG. 9, the oversupply of the fuel is performed to the engine to start the rich purge at timing t51. Then, as shown in FIG. 9, the air fuel ratio A/F upstream of the NOx catalyst with respect to the flow direction of the exhaust gas becomes rich temporarily. Thus, the occluded NOx is reduced and removed with HC, CO and the like contained in the exhaust gas, so the occluded NOx is discharged from the catalyst. As shown by a solid line L51a in FIG. 9, the air fuel ratio A/F downstream of the NOx catalyst with respect to the exhaust gas flow is maintained at the stoichiometric air fuel ratio A/F0 during reduction removal (discharge) of the occluded NOx.

In the example shown in FIG. 9, the reduction removal (discharge) of the occluded NOx ends at timing t52. The end timing can be detected based on a change in the air fuel ratio A/F downstream of the NOx catalyst with respect to the flow direction of the exhaust gas. In detail, when the air fuel ratio A/F shifts from the stoichiometric air fuel ratio A/F0 to the rich side and falls below a predetermined end determination value (threshold TH1) to the richer side, it is determined that the discharge of the occluded NOx ends and the rich purge is ended (stopped) as shown in FIG. 9. Thus, the air fuel ratio A/F returns to the lean state of the steady operation. The threshold TH1 is set slightly on the richer side than the stoichiometric air fuel ratio A/F0. If the rich purge is continued though the discharge of the occluded NOx ends, there is s possibility that the emission is deteriorated by the discharge of the unburned fuel (i.e., rich exhaust gas). The threshold TH1 is set so that the rich purge can be stopped (ended) immediately after the end of the discharge of the occluded NOx is determined. However, with such the setting, as shown by a broken line L51b in FIG. 9, the occluded NOx cannot be discharged thoroughly, and a certain quantity of the occluded NOx remains as shown by an area R1 in FIG. 9 (area R1 correlates with remaining quantity).

The device periodically performs the rich purge as the catalyst recovery processing to reduce and remove the substantially entirety of the occluded NOx. Thus, the device periodically recovers the purifying performance (exhaust purification performance) of the NOx catalyst.

The device diagnoses the degree of the performance degradation of the catalyst based on the NOx quantity occluded by the catalyst per unit time, i.e., the NOx quantity (NOx occlusion quantity per unit time) occluded from the time when the previous rich purge is performed to the time immediately before the present rich purge is performed. When the NOx occlusion quantity is small, it is determined that the degree of the performance degradation of the catalyst is high and suitable recovery processing is performed, for example. The NOx catalyst is set under a purifying condition (environment enabling discharge of occluded NOx) only while the rich purge is performed. Therefore, the NOx occlusion quantity per unit time (NOx occlusion quantity before starting rich purge) can be estimated based on a time length (unit time t51-t52) from the timing t51, at which the rich purge is started, to the timing t52, at which the reduction removal (discharge) of the occluded NOx ends. It can be determined that the NOx occlusion quantity increases as the time length t51-t52 lengthens. At this time, a certain estimation error arises due to the residual NOx approximately corresponding to the area R1 in FIG. 9. Therefore, it is desirable to correct the estimation error by suitable computation or the like.

Thus, the catalyst can be recovered periodically even with the conventional device including the device described in Japanese Patent Gazette No. 2692380. The device can detect the degradation of the catalyst in an early stage and perform the recovery processing concerning the sulfur poisoning and the like by performing the degradation diagnosis when performing the recovery processing. However, the purifying performance of the catalyst is significantly affected by environmental temperature. Usually, the purifying performance of the catalyst declines and the reduction speed of the NOx slows down if the temperature of the catalyst is higher or lower than appropriate temperature. Therefore, when the catalyst recovery processing and the catalyst diagnosis processing are performed under such the temperature environment, the air fuel ratio A/F downstream of the NOx catalyst with respect to the exhaust gas flow direction falls below the predetermined end determination (threshold TH1) to the richer side and the rich purge is ended (stopped) in an early stage (for example, at timing t53) where a residual NOx quantity is still large as shown by a chain double-dashed line L52a in FIG. 9. Due to the large residual NOx substantially shown by an area R2 in FIG. 9 (area R2 corresponds to remaining quantity), the estimation accuracy of the NOx occlusion quantity (NOx occlusion quantity before starting rich purge) is deteriorated. If such the large error arises, thorough correction cannot be performed even if the suitable correction calculation is performed, for example, in accordance with the catalyst temperature. Accordingly, the deterioration of the diagnosis accuracy of the catalyst diagnosis processing is unavoidable.

In order to inhibit such the deterioration of the diagnosis accuracy, a scheme of altering the threshold TH1 to the richer side (for example, to threshold TH2 in FIG. 9) to reduce the residual NOx quantity as of the end of the rich purge may be employed. However, in this case, there is a concern about the deterioration of the emission as mentioned above. Therefore, it is difficult for the device described in Japanese Patent Gazette NO. 2692380 to perform the catalyst diagnosis processing with high reliability and accuracy while maintaining good emission.

There is another device that performs the catalyst diagnosis processing only when the catalyst temperature is within a predetermined range. However, there is a concern that the device cannot perform the catalyst diagnosis processing over a long period of time depending on the temperature environment of the catalyst, so it is difficult to detect the degradation of the catalyst in an early stage with high reliability.

SUMMARY OF THE INVENTION

It is an object of the present invention to provide a diagnosis device of an exhaust purification catalyst capable of performing catalyst diagnosis processing frequently with high reliability and high accuracy while maintaining good emission.

According to an aspect of the present invention, an exhaust purification catalyst diagnosis device for diagnosing a degree of performance degradation of a catalyst, which is provided in an exhaust system of an engine for exhaust purification, has a catalyst temperature determination device that determines whether temperature of the catalyst is in a predetermined diagnosis permission range before the diagnosis processing of the catalyst and a catalyst temperature control device that controls the temperature of the catalyst into the diagnosis permission range before the diagnosis processing of the catalyst when the catalyst temperature determination device determines that the temperature of the catalyst is outside the diagnosis permission range.

With such the structure, through the collaboration of the catalyst temperature determination device and the catalyst temperature control device, the temperature of the catalyst can be controlled into the predetermined diagnosis permission range (for example, range where purifying performance of catalyst is stable and high, i.e., activation temperature range) before the diagnosis processing (catalyst diagnosis processing) of the catalyst. Accordingly, the catalyst diagnosis processing is performed while the catalyst temperature is in the predetermined range (diagnosis permission range). As a result, the diagnosis processing can be performed with high reliability and high accuracy, while maintaining good emission. Moreover, the catalyst diagnosis processing can be performed at higher frequency by positively bringing the catalyst temperature into the predetermined range (diagnosis permission range), i.e., by arranging the temperature environment.

As the catalyst temperature control device, in addition to the device that performs the rich purge or a device that controls other arbitrary heating devices such as a heater, other devices such as a device that controls an arbitrary cooling device may be employed according to the use or the like.

As the catalyst temperature determination device, in addition to a device that determines whether the temperature of the catalyst is in the diagnosis permission range directly based on the catalyst temperature measured by an arbitrary device or method, a device that indirectly determines whether the temperature of the catalyst is in the diagnosis permission range based on the engine operation mode or the like may be employed. For example, it may be automatically determined that the catalyst temperature is lower than the diagnosis permission range immediately after the engine start, and the temperature increase control may be started without measuring the temperature (or without obtaining temperature as measured value).

Moreover, the diagnosis permission range may be a range indicating a range or ranges to be removed, e.g., a range with only an upper limit or a lower limit. The diagnosis permission range may be set only with the lower limit when it is beforehand known that the catalyst is heated from the cooled state, e.g., before the engine warm-up (i.e., immediately after starting).

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
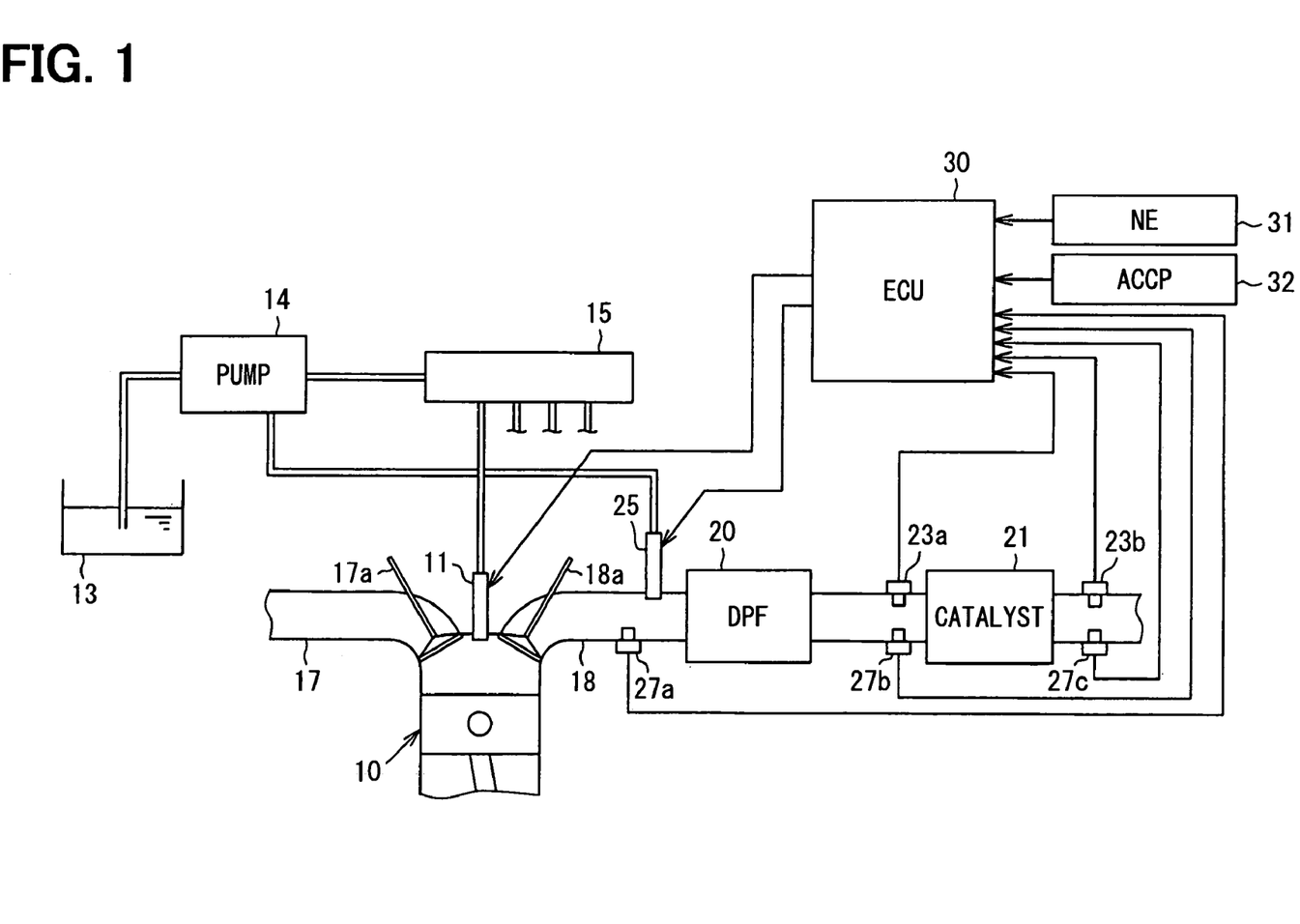
FIG. 1 is a schematic diagram showing an engine control system including an exhaust purification catalyst diagnosis device according to an embodiment of the present invention.

Now, a diagnosis device of an exhaust purification catalyst according to an embodiment of the present invention will be explained with reference to drawings. The device according to the present embodiment provides a LNT system (Lean NOx Trap system), which reduces occluded NOx by making an air fuel ratio upstream of the catalyst with respect to a flow direction of exhaust gas temporarily rich, in an engine control system like the device shown in FIG. 9. In the present embodiment, the device is applied to a car (diesel car) that has a diesel engine (internal combustion engine) as a source of power. With reference to FIG. 1, a detail of the engine system applied with the device (catalyst diagnosis device) will be explained first.

FIG. 1 is a schematic diagram showing a vehicular engine control system having the catalyst diagnosis device according to the present embodiment. A multi-cylinder reciprocating engine is assumed as an engine in the present embodiment. Only one cylinder is illustrated in FIG. 1 for the convenience of explanation. As shown in FIG. 1, the system has the internal combustion engine 10 as a diesel engine. The system also has various sensors, an ECU 30 (electronic control unit) and the like for controlling the engine 10. Hereafter, components constituting the system including the engine 10 as a control object will be explained in detail. The engine 10 has injectors 11 of an electromagnetic drive type (or piezo drive type, for example) in the cylinders respectively. Fuel injection from the injectors 11 into combustion chambers of the respective cylinders is performed in accordance with a predetermined combustion order.

A common rail fuel supply system is used as a fuel supply system that supplies the fuel. A high-pressure pump 14 compresses the fuel (light oil) drawn up from a fuel tank 13 and pumps the fuel to a common rail 15 as a pressure accumulation pipe. The fuel in the common rail 15 is maintained at the high-pressure state by the pumping of the fuel from the high-pressure pump 14. The high-pressure fuel in the common rail 15 is supplied to the injectors 11 and the high-pressure fuel is injected and supplied into the respective cylinders of the engine 10 through the valve opening action of the injectors 11. An intake pipe 17 and an exhaust pipe 18 are connected to the engine 10. If an intake valve 17a opens, an air is introduced (suctioned) into the cylinder through the intake pipe 17. If an exhaust valve 18a opens, exhaust gas produced through combustion of the fuel is discharged through the exhaust pipe 18.

A DPF 20 (diesel particulate filter) for collecting particulate matters contained in the exhaust gas and a catalyst 21 (NOx catalyst) of a NOx occlusion reduction type for purifying NOx contained in the exhaust gas are provided as an exhaust gas after treatment system for performing exhaust purification in the exhaust pipe 18 constituting an exhaust system of the engine 10. In the present embodiment, the DPF 20 is provided in an upstream portion of the exhaust pipe 18 and the NOx catalyst 21 is provided in a downstream portion of the exhaust pipe 18 with respect to the flow direction of the exhaust gas.

The DPF 20 is a continually regenerative particulate removing filter for collecting the particulate matters contained in the exhaust gas. The DPF 20 can be continuously used by repeatedly combusting and removing the collected particulate matters (as regeneration processing), for example, through a post-injection performed after a main fuel injection, which mainly contributes to the combustion. The DPF 20 supports an oxidation catalyst of a platinum family (not shown) and can remove HC and CO as well as a soluble organic fraction (SOF) as one of the particulate matter components.

The NOx catalyst 21 is a kind of generally and widely used NOx catalyst consisting of an alkaline earth material (occlusion material) and platinum, for example. The NOx catalyst 21 has characteristics of occluding the NOx in the exhaust gas when the atmosphere of the exhaust gas is a lean air fuel ratio (air fuel ration corresponding to fuel ratio lower than that of stoichiometric air fuel ratio) and of reducing and eliminating the occluded NOx with the use of reduction components such as HC and CO contained in the exhaust gas when the air fuel ratio becomes rich (air fuel ratio corresponding to fuel ratio higher than that of stoichiometric air fuel ratio).

A fuel addition valve 25 consisting of a suitable injector and the like is provided in the exhaust pipe 18 near an upstream inlet of the DPF 20. Part of the low pressure fuel (light oil) drawn up from the fuel tank 13 is supplied to the fuel addition valve 25. Through valve opening action of the fuel addition valve 25, the engine fuel (light oil) is added (supplied through injection) to the proximity of the upstream inlet of the DPF 20. An exhaust temperature sensor 27a for sensing exhaust temperature is provided near the upstream inlet of the DPF 20.

A/F sensors 23a, 23b and exhaust temperature sensors 27b, 27c are provided upstream and downstream of the NOx catalyst 21 (in detail, near inlet and outlet of NOx catalyst 21) respectively. The upstream and downstream A/F sensors 23a, 23b are oxygen concentration sensors that output oxygen concentration sensing signals corresponding to current oxygen concentrations in the exhaust gas. The air fuel ratio is serially calculated based on the oxygen concentration sensing signals. Generally, adjustment is made such that the oxygen concentration sensing signal as the sensor output (oxygen concentration sensing signal) of each of the A/F sensors 23a, 23b changes linearly in accordance with the oxygen concentration. Like the exhaust temperature sensor 27a, the upstream and downstream exhaust temperature sensors 27b, 27c sense the exhaust temperature. Thus, the temperature of the NOx catalyst 21 can be estimated (calculated) based on the outputs of the sensors.

The ECU 30 is the main part that performs engine control as an electronic control unit in the system. In addition to the sensor outputs (sensing signals) of the A/F sensors 23a, 23b and the exhaust temperature sensors 27a-27c, sensing signals of various sensors such as a rotation speed sensor 31 for sensing engine rotation speed NE and an accelerator sensor 32 for sensing an accelerator operation amount ACCP (accelerator position) provided by an operator (driver) are serially inputted into the ECU 30. The ECU 30 operates the various actuators such as the injectors 11 in desired modes based on the sensing signals of the various sensors for sensing the operation state of the engine 10 and the request of the user to perform various kinds of control of the engine 10 such as fuel injection control.

In more detail, the ECU 30 includes a microcomputer (not shown). Fundamentally, the microcomputer consists of various kinds of computation units, storage devices, communication devices and the like, such as a CPU (basic processing unit) that performs various kinds of computation, a RAM (random access memory) as a main memory that temporarily stores data in the middle of the computation, computation results and the like, a ROM (read only memory) as a program memory, an EEPROM (electrically rewritable nonvolatile memory) as a memory for data storage, a backup RAM (RAM energized by backup power source such as in-vehicle battery), and input/output ports for inputting/outputting signals to/from an exterior. Various kinds of programs, control maps and the like concerning the engine control including the program concerning the exhaust purification control are beforehand stored in the ROM, and the various kinds of control data including design data of the engine 10 are beforehand stored in the data storage memory (EEPROM).

The system according to the present embodiment uses the characteristic of the NOx catalyst 21 described above and repeats the occlusion and the reduction (discharge) of the NOx with the NOx catalyst 21 like the device shown in FIG. 9. Thus, the system purifies the NOx contained in the exhaust gas and reduces the NOx emission quantity. The system performs processing for serially reducing and removing the occluded NOx from the NOx catalyst 21 (catalyst recovery processing) based on a predetermined execution condition to recover from temporary lowering of the NOx purifying performance caused in accordance with the NOx occlusion quantity. The system according to the present embodiment also performs the catalyst recovery processing by performing oversupply of the fuel for combustion (i.e., rich purge). On the occasion of the catalyst recovery processing, the degree of the performance degradation of the NOx catalyst 21 (for example, existence or nonexistence of sulfur poisoning) resulting from the sulfur component and the like contained in the engine fuel (light oil) is diagnosed as in the device described in FIG. 9. The device according to the present embodiment controls the temperature of the NOx catalyst 21 within a predetermined temperature range (diagnosis permission range) before the diagnosis processing (catalyst diagnosis processing). Thus, the catalyst diagnosis processing can be performed frequently with high reliability and high accuracy while maintaining the good emission.

Figure 2:
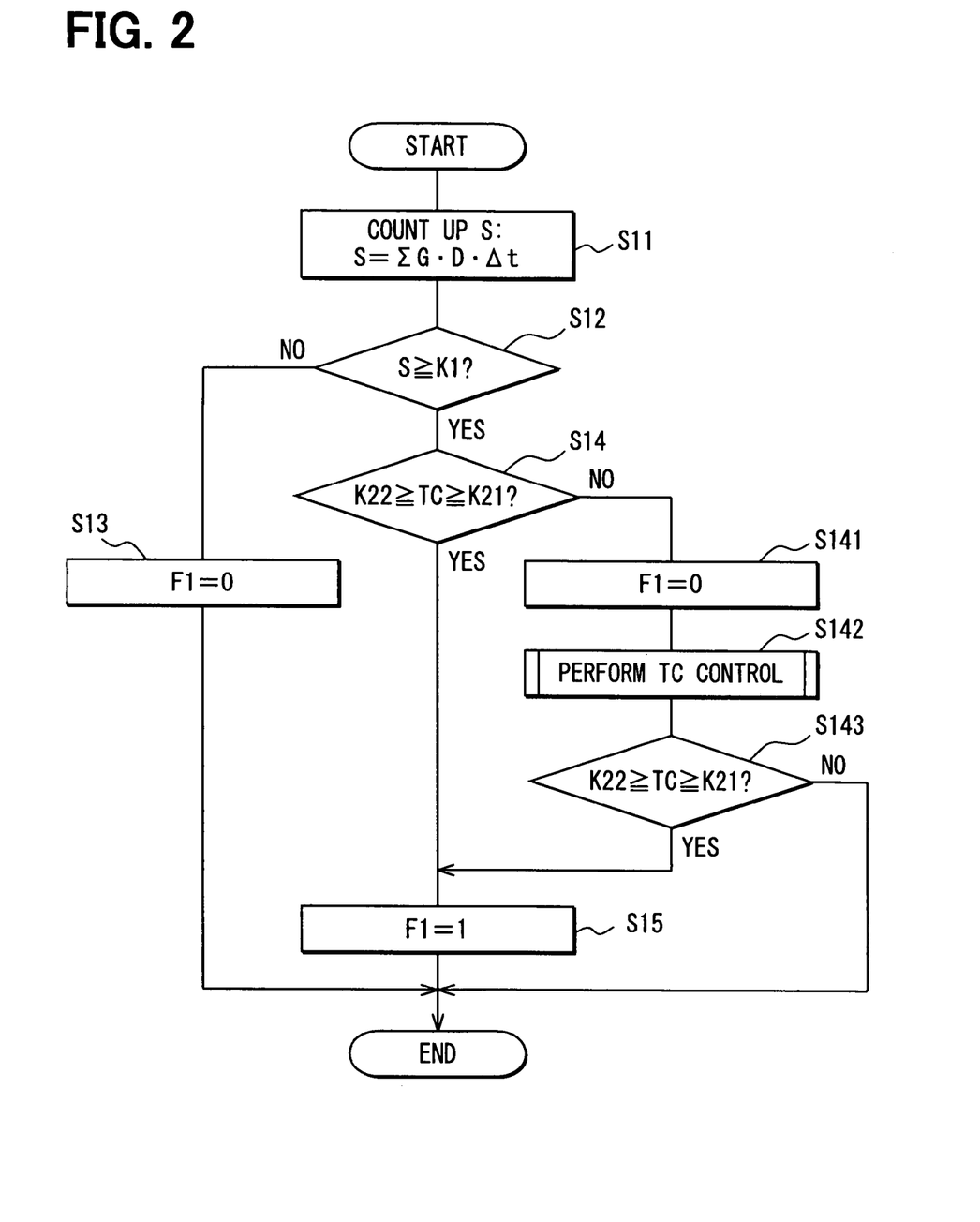
FIG. 2 is a flowchart showing a procedure of processing concerning an execution condition of catalyst diagnosis processing according to the embodiment.
Figure 4A:
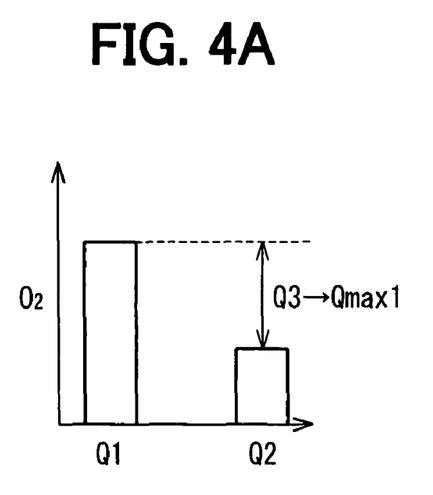
FIG. 4A is a graph showing an oxygen quantity in exhaust gas, an oxygen quantity consumed by HC originally existing in the exhaust gas, and an oxygen quantity that can react.
Figure 5A:
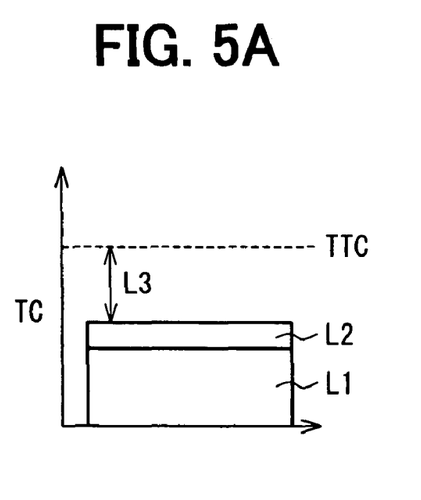
FIG. 5A is a diagram showing target catalyst temperature, present catalyst temperature, temperature increase degree, and addition temperature increase according to the embodiment.
Figure 6:
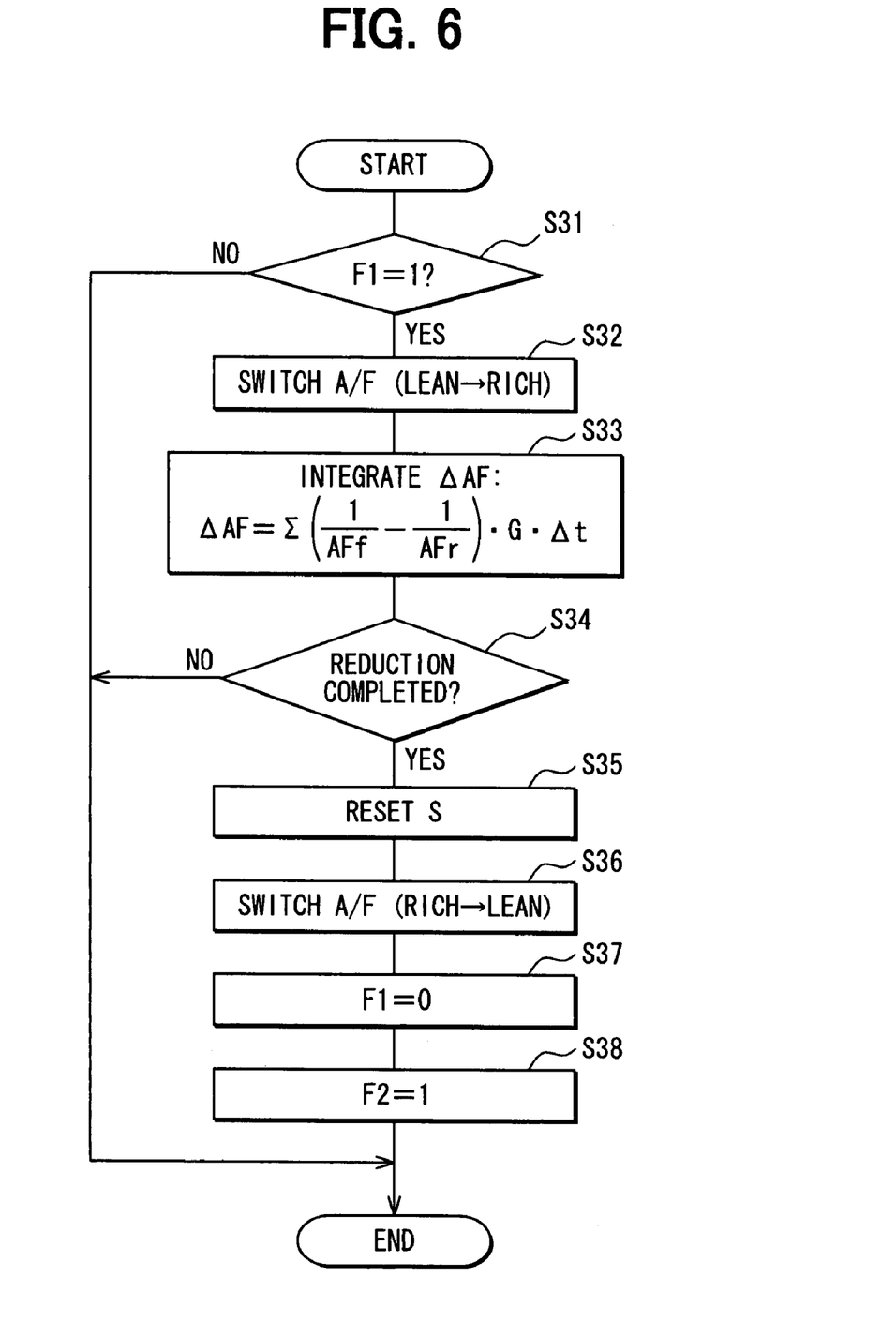
FIG. 6 is a flowchart showing a procedure of catalyst recovery processing according to the embodiment.
Figure 7:
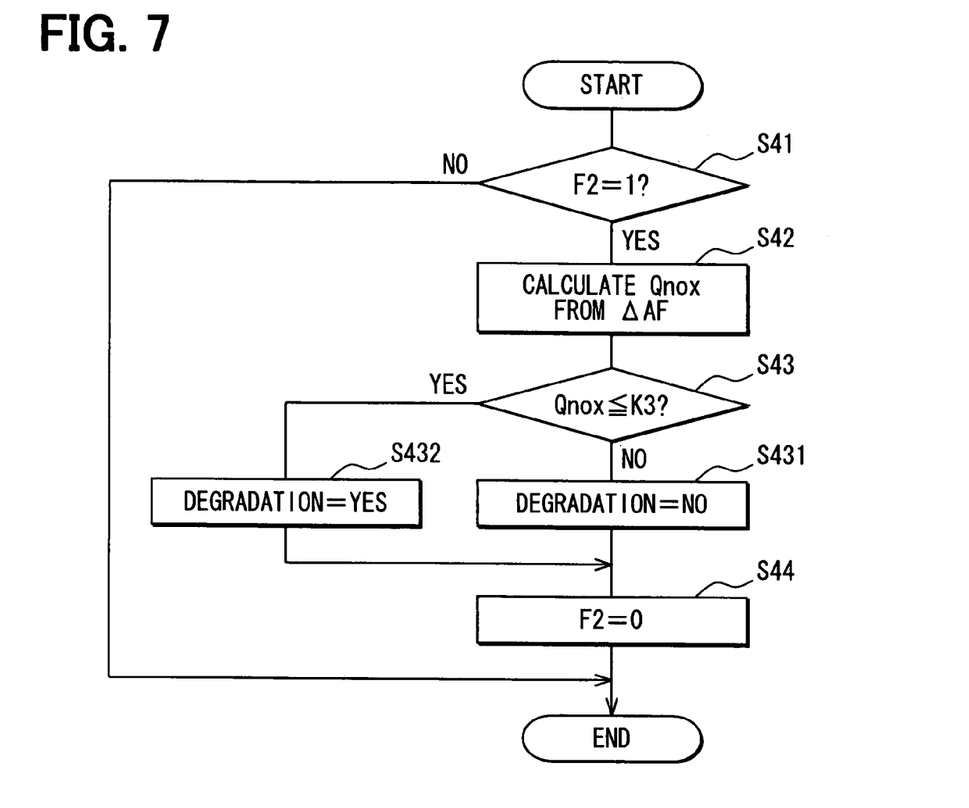
FIG. 7 is a flowchart showing a procedure of the catalyst diagnosis processing according to the embodiment.

Next, the catalyst diagnosis processing according to the present embodiment will be explained in detail with reference to FIGS. 1 to 8. The explanation will be given by using a general operation mode of the diesel engine, i.e., a case where steady operation of the engine 10 is performed by lean combustion, as an example. FIGS. 2, 3, 6, and 7 are flowcharts showing a procedure of the catalyst diagnosis processing performed by the device (ECU 30) according to the present embodiment. The ECU 30 executes the programs stored in the ROM to perform the processing shown by the flowcharts. Values of various parameters used in the processing shown by the respective flowcharts are stored at any time in the storage devices mounted in the ECU 30 such as the RAM and the EEPROM and are updated at any time if needed. The processing of FIGS. 2, 6 and 7 is performed serially at every predetermined crank angle or in a cycle of a predetermined time period. The first step of the processing shown in FIGS. 6 and 7 determines whether the execution condition is satisfied. That is, in the processing of FIG. 6 or 7, it is meant that the execution condition is satisfied when flag F1 or F2 is set at 1. It is repeatedly determined whether the execution condition is satisfied until the condition is satisfied. If the condition is satisfied, the processing proceeds to the next step. In the present embodiment, the initial values of the flags F1 and F2 are set at 0. Therefore, only the processing of FIG. 2 advances in the beginning.

Next, the processing of FIG. 2 will be explained. As shown in FIG. 2, in a series of the processing, first, S11 calculates (counts up) an introduction NOx quantity S by integrating an introduction NOx quantity, which is introduced into the NOx catalyst 21 through the exhaust pipe 18 per unit time, with unit time $\Delta t$. The introduction NOx quantity is a product of an exhaust flow rate G and an introduction NOx concentration D. For example, the introduction NOx quantity S is calculated by a formula: $S=\Sigma G \cdot D \cdot \Delta t$. The introduction NOx concentration D can be estimated based on the engine operation state (operation mode) of each time, for example. That is, combustion temperature can be calculated based on the engine rotation speed NE, a load (accelerator operation amount ACCP) and the like, and the induction NOx concentration D can be estimated based on the combustion temperature. The introduction NOx concentration D can be also calculated by providing a NOx sensor in the exhaust pipe 18 and by sensing the NOx concentration in the exhaust gas directly. The exhaust gas flow rate G can be sensed by providing an airflow meter or the like in an intake system, for example. The exhaust gas flow rate G can be calculated based on the engine operation area with the use of a map or a formula. In the present embodiment, the exhaust gas flow rate G is sensed with the airflow meter (not shown).

Next, S12 determines whether the introduction NOx quantity S calculated at S11 is "equal to or greater than" a predetermined threshold value K1 (parameter related to execution interval of catalyst recovery processing). If it is determined that the introduction NOx quantity S is less than the threshold value K1 (S<K1), it is determined that the execution of the rich purge is unnecessary this time. Then, following S13 resets the execution flag F1 (F1=0), and then, this series of the processing is ended.

When it is determined that the introduction NOx quantity S is equal to or greater than the predetermined threshold value K1 (S≧K1), the processing proceeds to S14. S14 determines whether the temperature TC of the NOx catalyst 21 is in a range (diagnosis permission range) equal to or higher than a predetermined threshold value K21 and equal to or lower than a predetermined threshold value K22 (K22≧TC≧K21). The diagnosis permission range is set at the range from 350° C. to 450° C., for example. The purification performance of the general NOx occlusion reduction catalyst is stable and high in the temperature range from 350° C. to 450° C. That is, the temperature range 350° C. to 450° C. is generally an activation temperature range of the general NOx occlusion reduction catalyst. The temperature of the NOx catalyst 21 (for example, temperature of catalyst center) can be estimated (calculated) based on the output values of the exhaust temperature sensors 27b, 27c provided near the inlet and the outlet of the NOx catalyst 21, for example.

If S14 determines that the temperature TC of the NOx catalyst 21 is out of the diagnosis permission range (i.e., TC<K21 or TC>K22), following S141 resets the execution flag F1 (F1=0), and further following S142 controls the temperature TC of the NOx catalyst 21 into the diagnosis permission range (presented at S14).

Next, contents of the temperature control at S142 will be explained in detail with reference to FIG. 3. Here, explanation will be given, assuming the case where cold operation immediately after the engine start is performed (operation while catalyst is still cold before warm-up) as an example. First, in the present embodiment, on the occasion of the temperature control, addition operation of the fuel addition valve 25 is controlled to add more unburned components (mainly, HC) into the exhaust gas discharged from the engine 10 in addition to the unburned components (mainly HC) in the exhaust gas. The temperature of the NOx catalyst 21 is raised with the reaction heat generated when the unburned components in the exhaust gas and the oxygen in the exhaust gas react on the NOx catalyst 21, e.g., through following exothermic reaction: $HC+O_2=H_2O+CO_2$.

At this time, if the quantity of the unburned components in the exhaust gas is increased to raise the temperature TC of the NOx catalyst 21, the discharge of the occluded NOx from the NOx catalyst 21 is started. As a result, a diagnosis error of the catalyst diagnosis processing performed after the temperature control will be increased. That is, the diagnosis accuracy will be deteriorated. Therefore, in the present embodiment, the catalyst temperature TC is controlled into the diagnosis permission range (presented at S14) by variably controlling the quantity of the unburned components in the exhaust gas with the fuel addition valve 25 within the range where the rich air fuel ratio, which is the discharge condition (purification condition) of the occluded NOx, is not reached.

Figure 3:
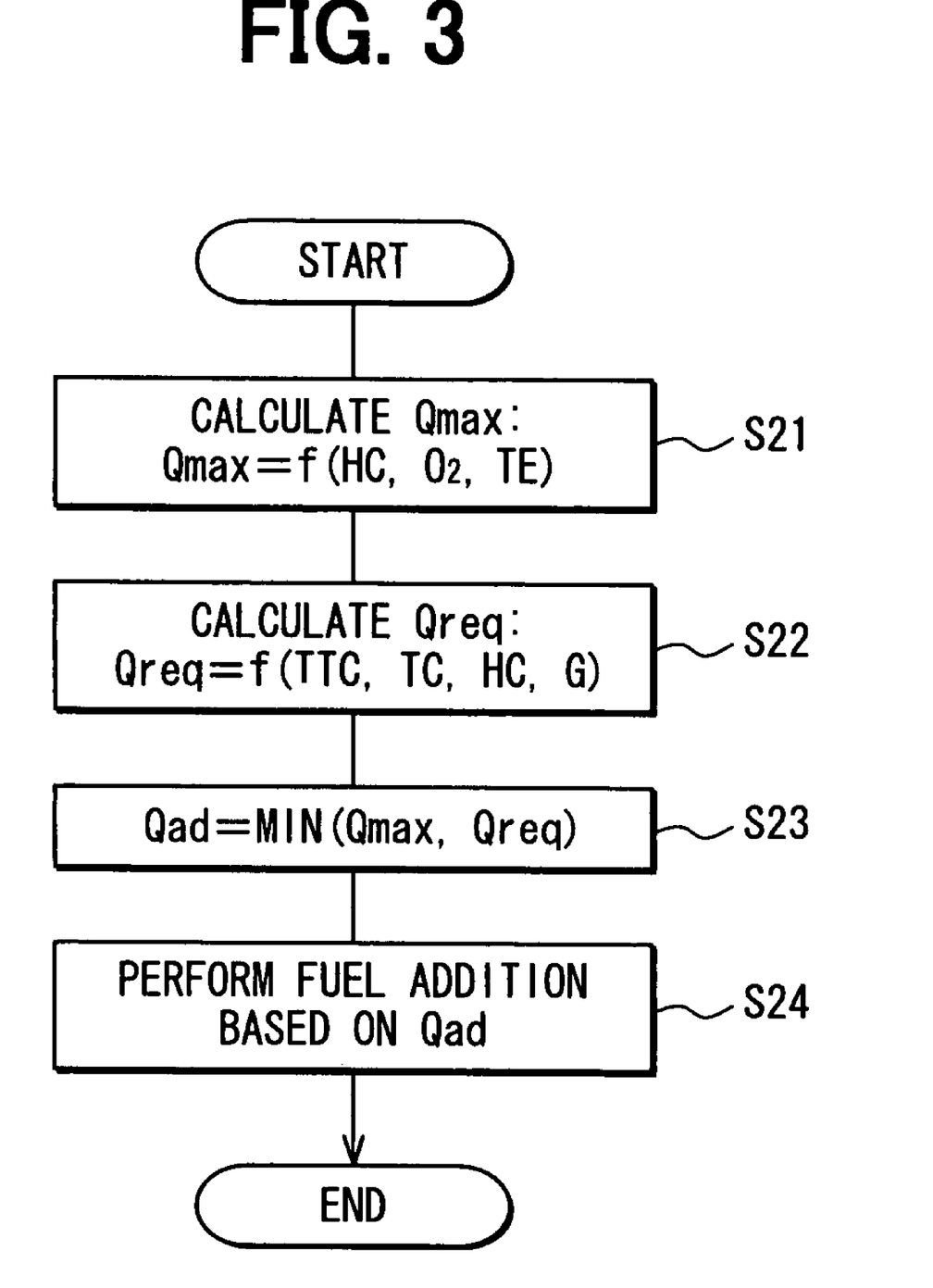
FIG. 3 is a flowchart showing contents of processing of temperature control in the catalyst diagnosis processing according to the embodiment.

That is, as shown in FIG. 3, in this series of the processing, S21 first calculates a permission upper limit Qmax that decides a fuel addition permission range of the fuel addition quantity (supply quantity) of the fuel addition valve 25. In detail, for example, the permission upper limit Qmax is calculated based on the HC quantity in the exhaust gas, the oxygen concentration in the exhaust gas and the exhaust temperature TE, by a following expression: $Qmax=f(HC, O_2, TE)$.

Next, the calculation processing of the permission upper limit Qmax will be explained further with reference to FIGS. 4A and 4B. FIG. 4A is a graph showing the oxygen quantity Q1 (oxygen concentration) in the exhaust gas, the oxygen quantity Q2 consumed in the reaction with the HC, which has been contained in the exhaust gas since the time before the fuel addition, and the oxygen quantity Q3 that can react out of the oxygen in the exhaust gas. As shown in FIG. 4A, the oxygen quantity Q3 that can react out of the oxygen ($O_2$) contained in the exhaust gas can be derived from the relationship between the oxygen quantities Q1, Q2. The oxygen quantity Q3 can be calculated as the difference between the quantities Q1, Q2 (i.e., Q3=Q1−Q2). The addition quantity Qmax1 capable of reacting with the oxygen in the exhaust gas can be calculated based on the oxygen quantity Q3 that can react. The oxygen quantity Q1 in the exhaust gas can be sensed based on the sensor output (sensing signal) of the A/F sensor 23a provided near the inlet of the NOx catalyst 21, for example. The oxygen quantity Q2 consumed in the reaction with the HC in the exhaust gas can be calculated from the HC quantity in the exhaust gas estimated based on the engine operation state (for example, engine rotation speed NE and load). The HC quantity in the exhaust gas and the oxygen quantity Q2 consumed by the HC can be also calculated by providing a HC sensor in the exhaust pipe 18 and directly sensing the HC concentration in the exhaust gas.

If a large quantity of the fuel is injected from the fuel addition valve 25, there is a possibility that the injected fuel cannot be thoroughly atomized and part of the injected fuel adheres to the pipe (exhaust pipe 18). The inventors found that the adhesion quantity of the injected fuel is generally dependent on the exhaust temperature, and in more detail, that the injected fuel becomes less apt to adhere (i.e., adhesion quantity decreases) as the exhaust temperature increases. Therefore, in the present embodiment, an upper limit guard value Qmax2 of the fuel addition quantity (supply quantity) is set based on the exhaust temperature TE. The upper limit guard value Qmax2 is set using a map shown in FIG. 4B, for example. That is, the upper limit guard value Qmax2 is set higher as the exhaust temperature TE increases. The exhaust temperature TE can be estimated (calculated) based on the sensor output (sensing signal) of the exhaust temperature sensor 27a provided near the fuel addition valve 25, for example.

S21 in FIG. 3 calculates a permission upper limit Qmax of the fuel addition quantity (supply quantity) to be injected by the fuel addition valve 25 based on the addition quantity Qmax1 that can react and the upper limit guard value Qmax2. Specifically, the smaller one between the addition quantity Qmax1 that can react and the upper limit guard value Qmax2 is set as the permission upper limit Qmax (fuel addition permission range) (i.e., Qmax=MIN(Qmax1, Qmax2)). Thus, the fuel addition (fuel addition by fuel addition valve 25) of the quantity over the permission upper limit Qmax is forbidden.

In the processing of FIG. 3, S22 calculates a fuel addition required quantity for controlling the temperature TC of the NOx catalyst 21 into the diagnosis permission range (presented at S14) after S21. The fuel addition required quantity is a required addition quantity Qreq (fuel added by fuel addition valve 25) necessary for increasing the temperature TC to target catalyst temperature TTC (for example, 400° C.). For example, the required addition quantity Qreq is calculated based on the target catalyst temperature TTC, the present catalyst temperature TC, the HC quantity in the exhaust gas and the flow rate G of the exhaust gas (i.e., Qreq=f(TTC, TC, HC, G)).

Next, the calculation processing of the required addition quantity Qreq will be explained with reference to FIGS. 5A and 5B. FIG. 5A is a graph showing the target catalyst temperature TTC, the present catalyst temperature L1, a temperature increase degree L2 according to the HC quantity in the exhaust gas, and addition temperature increase L3 increased by the fuel addition. As shown in FIG. 5A, the addition temperature increase L3 is decided from the relationship between the parameters and can be calculated by a following expression: L3=TTC−(L1+L2). The required addition quantity Qreq necessary for increasing the temperature TC to the target catalyst temperature TTC can be calculated based on the addition temperature increase L3.

Furthermore, in the present embodiment, the required addition quantity Qreq is corrected based on the exhaust gas flow rate G. The inventors found that the heat release amount by the NOx catalyst 21 increases as the exhaust gas flow rate G (equivalent to exhaust quantity passing through NOx catalyst 21) increases and that the temperature increase amount of the NOx catalyst 21 decreases as the exhaust gas flow rate G increases. Therefore, in the present embodiment, the required addition quantity Qreq is corrected based on the exhaust gas flow rate G. The required addition quantity Qreq is corrected with the use of a map shown in FIG. 5B, for example. That is, the required addition quantity Qreq is corrected to be larger as the exhaust gas flow rate G increases. Thus, S22 (in FIG. 3) calculates the required addition quantity Qreq.

In the processing shown in FIG. 3, S23 calculates a target addition quantity Qad as a control target value after S22. The smaller one between the permission upper limit Qmax and the required addition quantity Qreq is set as the target addition quantity Qad (Qad=MIN(Qmax, Qreq)). Following S24 performs the fuel addition with the fuel addition valve 25 based on the target addition quantity Qad calculated at S23.

Thus, in the present embodiment, the fuel addition quantity (supply quantity) of the fuel addition valve 25 is variably controlled to the target addition quantity Qad to conform (or approximate) the temperature TC of the NOx catalyst 21 to the target catalyst temperature TTC. If the permission upper limit Qmax provides a sufficient control range (range enabling temperature increase to target temperature), the temperature TC of the NOx catalyst 21 is controlled by the fuel addition (at S24) into the diagnosis permission range (represented at S14). A series of the processing concerning the temperature control ends with the processing of S24.

If S142 of FIG. 2 (i.e., processing shown in FIG. 3) ends, following S143 determines again whether the temperature TC of the NOx catalyst 21 is within the diagnosis permission range (as in S14). If S143 determines that the temperature TC of the NOx catalyst 21 is within the diagnosis permission range, following S15 sets the execution flag F1 at 1 (F1=1). Thus, the execution condition of the processing of FIG. 6 is satisfied. When the permission upper limit Qmax (FIG. 3) does not provide the sufficient control range, S143 determines that the temperature TC of the NOx catalyst 21 is out of the diagnosis permission range. In this case, S142 repeatedly performs the temperature control shown in FIGS. 3 and 4 until S143 determines that the temperature TC of the NOx catalyst 21 is within the diagnosis permission range.

Next, the processing of FIG. 6 will be explained. The processing shown in FIG. 6 is concerned with the catalyst recovery processing (rich purge) mentioned above. In a series of the processing shown in FIG. 6, first, S31 determines whether the execution condition is satisfied. If the condition is satisfied, the processing proceeds to S32. S32 switches the air fuel ratio from the lean state to the rich state (if air fuel ratio has been rich, air fuel ratio is maintained rich). In the present embodiment, the oversupply of the fuel to the NOx catalyst 21 (i.e., rich purge) is performed at the air fuel ratio of approximately 12.0, for example. It can be determined whether the rich purge is performed based on the sensing signal of the A/F sensor 23a provided upstream of the NOx catalyst 21 (i.e., air fuel ratio is rich during rich purge execution). If the reduction and the removal of the occluded NOx are in progress, the supplied reduction component (reducing agent) is consumed by the reduction and the removal even during the rich purge execution. Therefore, unlike the sensing signal of the upstream A/F sensor 23a, the A/F sensor 23b provided downstream of the NOx catalyst 21 provides the sensing signal exhibiting the lean air fuel ratio or the stoichiometric air fuel ratio (like transitions of parameters shown by solid lines in FIG. 9).

In the state where the rich purge is thus performed, following S33 calculates the quantity of the reducing agent consumed by the rich purge control (reducing agent consumption quantity $\Delta AF$) by integrating the reducing agent quantity consumed per unit time $\Delta t$ (through temporal integration). The reducing agent consumption quantity $\Delta AF$ is reset every time the flag F1 is changed from 0 to 1. The reducing agent consumption quantity $\Delta AF$ is calculated and updated based on the sensor outputs (sensing signals) of the A/F sensors 23a, 23b provided upstream and downstream of the NOx catalyst 21 and the exhaust gas flow rate G. For example, the reducing agent consumption quantity $\Delta AF$ is calculated and updated by a following formula: $\Delta AF = \Sigma[(1/AFf)-(1/AFr)] \cdot G \cdot \Delta t$, while reading the initial value and the previous value. AFf is the sensor output of the A/F sensor 23a upstream of the NOx catalyst 21, and AFr is the sensor output of the A/F sensor 23b downstream of the NOx catalyst.

Following S34 determines whether substantially an entire portion of the NOx occluded in the NOx catalyst 21 is reduced and removed through the rich purge. Specifically, it is determined whether the reduction removal of the occluded NOx is completed based on the sensing signal of the downstream A/F sensor 23b. That is, if the rich air fuel ratio is sensed by the A/F sensor 23b, it is determined that the reduction removal of the occluded NOx is completed. As mentioned above, the lean air fuel ratio or the stoichiometric air fuel ratio is detected by the A/F sensor 23b until the reduction removal is completed. The threshold value (threshold value TH1), e.g., shown in FIG. 9, is set slightly to the richer side than the stoichiometric air fuel ratio A/F0 such that the rich purge can be stopped (ended) immediately after the end of the discharge of the occluded NOx is determined. Until S34 determines that the substantially entire portion of the occluded NOx is reduced and removed (i.e., reduction removal of occluded NOx is completed), the rich purge is continuously applied to the NOx catalyst 21 and the reducing agent consumption quantity $\Delta AF$ is continuously integrated at S33.

If it is determined that the substantially entire portion of the occluded NOx is reduced and removed at S34, following S35 resets the introduction NOx quantity S (S=0). Then, following S36 switches the air fuel ratio from the rich state to the lean state (air fuel ratio as of steady operation) again. Thus, the catalyst recovery processing (rich purge) is ended. Then, following S37 resets the execution flag F1 to 0 and following S38 sets the execution flag F2 at 1. Thus, the execution condition of the processing of FIG. 6 is not satisfied and the execution condition of the processing of FIG. 7 is satisfied.

Figure 8:
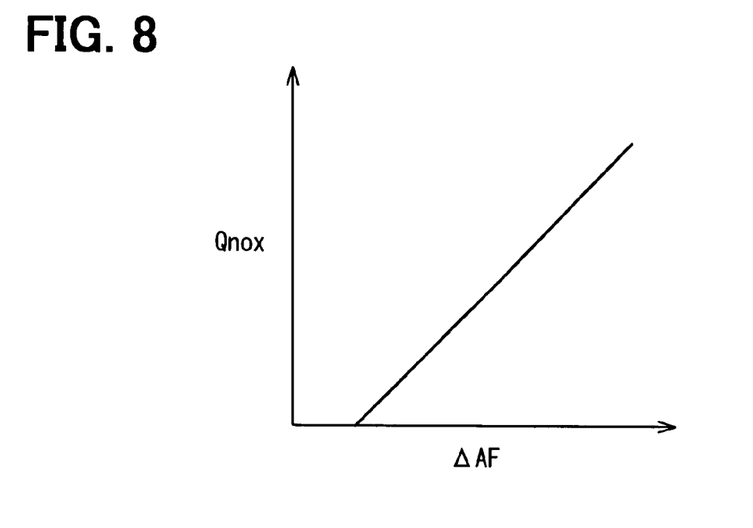
FIG. 8 is a graph showing a map used for the catalyst diagnosis processing according to the embodiment.

Next, processing described in FIG. 7 will be explained. The processing shown in FIG. 7 is specifically concerned with diagnosis in the catalyst diagnosis processing mentioned above. In a series of the processing shown in FIG. 7, first, S41 determines whether the execution condition is satisfied. If the condition is satisfied, the processing proceeds to S42. S42 calculates the NOx occlusion quantity Qnox (equivalent to deterioration degree of NOx catalyst 21) based on the reducing agent consumption quantity $\Delta AF$ calculated at S33 of FIG. 6. In detail, the NOx occlusion quantity Qnox is calculated based on the relationship between the reducing agent consumption quantity $\Delta AF$ and the NOx occlusion quantity Qnox as shown in FIG. 8, i.e., a map obtained through the experiment and the like beforehand and stored in the ROM. Fundamentally, as shown in this FIG. 8, there is a relationship (substantially proportional relationship in example of FIG. 8) that the NOx occlusion quantity Qnox increases as the reducing agent consumption quantity $\Delta AF1$ increases.

Then, following S43 performs deterioration diagnosis by determining whether the NOx occlusion quantity Qnox (degradation degree of performance of NOx catalyst 21) calculated (measured) at S42 is "equal to or less than" a predetermined threshold value K3. If it is determined that the NOx occlusion quantity Qnox is greater than the threshold value K3 (Qnox>K3), it is determined that the NOx catalyst 21 is not degraded (degradation=NO). Then, following S431 performs predetermined processing as processing as of the no degradation (for example, determination result is stored in EEPROM). If it is determined that the NOx occlusion quantity Qnox is equal to or less than the threshold value K3

(Qnox≦K3), it is determined that the NOx catalyst 21 is degraded (degradation=YES, i.e., performance degradation due to other factor than NOx occlusion quantity occurs). Then, following S432 performs predetermined processing as processing as of the degradation (for example, sulfur poisoning recovery processing). In the case where the sulfur poisoning recovery processing is performed, the rich purge is performed over a long period of time (for example, 20 to 30 minutes) to maintain the state of the high temperature and the rich air fuel ratio. Thus, the SOx adhering to the NOx catalyst 21 is discharged, and the purifying performance of the NOx catalyst 21 is recovered. That is, the NOx catalyst 21 is recovered from the sulfur poisoning by performing the sulfur poisoning recovery processing. However, there are some cases where the NOx catalyst 21 does not fully recover (purifying performance does not recover) even if the sulfur poisoning recovery processing is performed because of other factors such as heat degradation. In such the cases, predetermined failsafe processing according to the situation of each time is performed. For example, the situation is reported to the user to urge suitable treatment, for example, by turning on a warning lamp (MIL lamp).

Regardless of the existence or nonexistence of the degradation, the execution flag F2 is set at 0 at S44 following S431 or S432. Thus, the execution condition of the processing of FIG. 7 is not satisfied, and the series of the processing of the catalyst diagnosis is ended.

Thus, in the present embodiment, the temperature of the NOx catalyst 21 is controlled into the predetermined temperature range (diagnosis permission range) (at S142 of FIG. 2 and in processing shown in FIG. 3) before the catalyst diagnosis processing (shown in FIG. 7). Thus, the catalyst temperature (specifically, bed temperature) of every time is positively brought into the predetermined range (diagnosis permission range), i.e., temperature environment is regulated. Thus, the performance degradation resulting from the above-mentioned temperature state (excessively low or excessively high temperature state) of the catalyst is inhibited. As a result, the state of the catalyst (purifying performance) shown by the solid line in FIG. 9 is maintained. Accordingly, the catalyst diagnosis system according to the present embodiment can frequently perform the catalyst diagnosis processing with high reliability and high accuracy while maintaining good emission.

The present embodiment described above exerts following effects.

(1) The exhaust purification catalyst diagnosis device for diagnosing the performance degradation degree of the NOx catalyst 21 provided in the exhaust system of the engine 10 for exhaust purification has the program (catalyst temperature determination device, S14 of FIG. 2) that determines whether the temperature of the NOx catalyst 21 is within the predetermined diagnosis permission range before (in detail, immediately before) the catalyst diagnosis processing (FIG. 7) and the program (catalyst temperature control device, FIG. 3) that controls the temperature of the NOx catalyst 21 into the diagnosis permission range before (in detail, immediately before) the catalyst diagnosis processing (FIG. 7) if S14 determines that the temperature of the NOx catalyst 21 is outside the diagnosis permission range. Accordingly, the catalyst diagnosis system according to the present embodiment can frequently perform the catalyst diagnosis processing with high reliability and high accuracy while maintaining good emission.

(2) The NOx occlusion reduction catalyst (NOx catalyst 21) that occludes the NOx (nitrogen oxides) contained in the exhaust gas and that performs the reduction purification of the NOx is an object of the diagnosis. Thus, the exhaust purification system with high purification performance regarding the NOx is provided.

(3) The diagnosis permission range is set between 350° C. and 450° C. With this setting, the high purifying performance of the catalyst is continuously obtained on the occasion of the catalyst diagnosis processing.

(4) The system has the program (S11 of FIG. 2) that estimates the NOx quantity of each time (NOx occlusion quantity) occluded by the NOx catalyst 21 and the program (S12 of FIG. 2) that employs the state that the NOx occlusion quantity (introduction NOx quantity S) estimated by S11 becomes equal to or greater than the predetermined value (threshold value K1) as one of the execution conditions of the catalyst recovery processing. Thus, the catalyst recovery processing is performed efficiently and the fuel consumption (fuel consumption rate) is improved because wasteful fuel consumption is inhibited.

(5) The system has the program (occlusion quantity estimation device, S42 of FIG. 7) that estimates the NOx quantity (NOx occlusion quantity per unit time) occluded by the NOx catalyst 21 per unit time (execution interval of rich purge) and the program (catalyst diagnosis device, S43 of FIG. 7) that performs the diagnosis processing of the NOx catalyst 21 based on the NOx occlusion quantity estimated by S42. Thus, the degree of the performance degradation of the NOx catalyst 21 can be diagnosed suitably based on the NOx occlusion quantity per unit time, which is estimated, e.g., based on the map shown in FIG. 8.

(6) The system has the program (reduction component supply device, S32 of FIG. 6) that performs the rich purge, i.e., supplies the NOx reduction component (light oil as hydrocarbon engine fuel mainly consisting of HC) to the NOx catalyst 21 for performing the reduction purification of the NOx occluded in the catalyst 21, the program (discharge start estimation device, S33 of FIG. 6) that estimates the start timing of the discharge of the occluded NOx from the NOx catalyst 21 based on the air fuel ratio change (change from lean state to rich state) of the exhaust gas upstream of the NOx catalyst 21 due to the rich purge, the program (discharge end estimation device, S34 of FIG. 6) that estimates the end timing of the discharge of the occluded NOx from the NOx catalyst 21 based on the air fuel ratio change (change from stoichiometric air fuel ratio or lean state to rich state) of the exhaust gas downstream of the NOx catalyst 21 due to the discharge of the NOx from the NOx catalyst 21, and the program (occlusion quantity estimation device, S42 of FIG. 7) that estimates the NOx occlusion quantity before the start of the rich purge based on the integration consumption quantity (reducing agent consumption quantity ΔAF) of the NOx reduction component in the time period from the discharge start timing estimated by S33 to the discharge end timing estimated by S34. Thus, the NOx occlusion quantity per unit time indicative of the NOx purifying performance of the NOx catalyst 21 can be estimated more suitably.

(7) As a method of calculating the consumption quantity (reducing agent consumption quantity) of the NOx reduction components (HC, CO and the like) in the NOx catalyst 21, the method of calculating the reducing agent consumption quantity based on the sensor outputs of the oxygen concentration sensors (A/F sensors 23a, 23b) provided upstream and downstream of the catalyst 21 respectively and the airflow meter provided in the intake system of the engine 10 as the object of the exhaust purification is used (S33 of FIG. 6). Thus, the reducing agent consumption quantity and the deterioration degree of the NOx catalyst 21 can be calculated with more precision.

(8) The system has the program (S432 of FIG. 7) that performs the processing (sulfur poisoning recovery processing) for recovering the exhaust purification performance of the catalyst 21 degraded by the sulfur poisoning when S43 determines that the degradation degree of the catalyst 21 calculated (estimated) at S42 of FIG. 7 is large, i.e., when S43 determines that the NOx occlusion quantity is equal to or less than the predetermined threshold value K3. Thus, the exhaust purification performance of the NOx catalyst 21 is maintained high more certainly.

(9) The predetermined failsafe processing (for example, lighting of warning light) is performed when the catalyst 21 is not fully regenerated even if the sulfur poisoning recovery processing is performed at S432 of FIG. 7. Thus, the failsafe processing for coping with the recovery failure is performed automatically.

(10) The system has the program (temperature increase device, S24 of FIG. 3) that supplies the temperature increase component (light oil as hydrocarbon engine fuel mainly consisting of HC) to the NOx catalyst 21 for increasing the temperature of the NOx catalyst 21 using the heat of the reaction, which occurs, e.g., on the NOx catalyst 21. In the processing of FIG. 3, the temperature of the NOx catalyst 21 is controlled into the diagnosis permission range by variably controlling the supply quantity of the temperature increase component. Thus, the temperature of the catalyst lower than the activation temperature can be easily controlled into the diagnosis permission range before the catalyst diagnosis processing (FIG. 7).

Figure 5B:
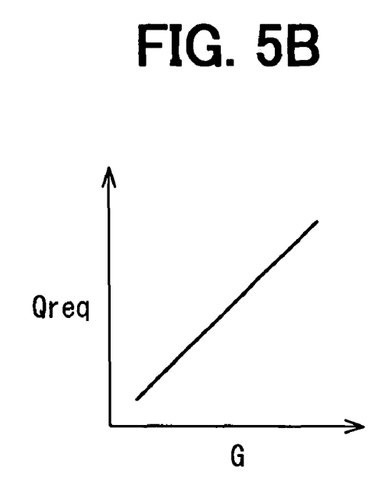
FIG. 5B is a graph showing a relationship between a required addition quantity and an exhaust gas flow rate according to the embodiment.

(11) In the processing of S22 of FIG. 3, the fuel addition quantity added by the fuel addition valve 25 is variably controlled based on the exhaust gas flow rate of the engine 10 (refer to FIG. 5B). The target catalyst temperature is variably set based on the exhaust gas flow rate of each time calculated based on the fresh air quantity. The fuel addition quantity added by the fuel addition valve 25 is variably controlled to conform (or approximate) the temperature of the NOx catalyst 21 to the target catalyst temperature. Thus, the temperature of the NOx catalyst 21 can be controlled suitably.

(12) In the processing of FIG. 3, the fuel addition quantity added by the fuel addition valve 25 is variably controlled within the range in which the condition concerning the occlusion and purification of the NOx catalyst 21 does not change from the occlusion condition (lean or stoichiometric air fuel ratio) to the purification condition (rich or stoichiometric air fuel ratio). Thus, the discharge of the occluded NOx, which can occur during the temperature increase processing (FIG. 3), is inhibited, and the subsequent catalyst diagnosis processing (FIG. 7) can be performed with higher accuracy.

(13) The system has the program (supply range setting device, S21 of FIG. 3) that variably sets the permission upper limit Qmax (permission supply range concerning supply quantity of temperature increase component) as the range where the condition concerning the occlusion and purification of the NOx catalyst 21 does not change from the occlusion condition to the purification condition. In the processing of FIG. 3, the fuel addition quantity added by the fuel addition valve 25 is variably controlled within the fuel addition permission range (equal to or below permission upper limit Qmax) set by S21. Thus, the range suitable for the situation of each time can be automatically set as the fuel addition permission range. As a result, the discharge of the occluded NOx, which can occur during the temperature increase processing (FIG. 3), is inhibited more suitably. The fuel consumption (fuel consumption rate) can be improved since the wasteful fuel consumption is inhibited.

(14) In S21 of FIG. 3, the permission upper limit Qmax (upper limit of permission supply range) is variably set based on the oxygen concentration of the exhaust gas upstream of the NOx catalyst 21 (FIG. 4A). Thus, the fuel addition permission range (permission supply range concerning supply quantity of temperature increase component) can be set more suitably.

Figure 4B:
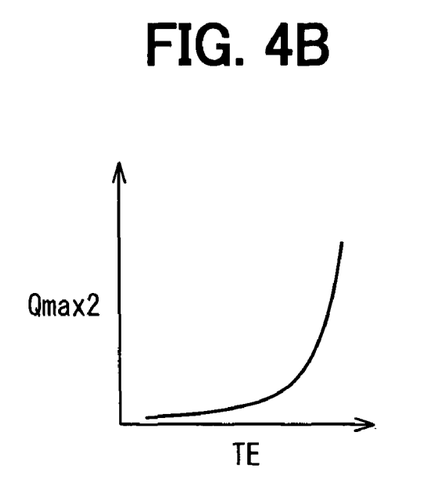
FIG. 4B is a graph showing a relationship between an upper limit guard value and exhaust temperature according to the embodiment.

(15) In S21 of FIG. 3, the permission upper limit Qmax (upper limit of permission supply range) is variably set based on the temperature of the exhaust gas discharged from the engine 10 (FIG. 4B). Thus, the permission upper limit Qmax (upper limit of permission supply range) can be set to the extent that the adhesion of the injected fuel (temperature increase component) does not occur based on the exhaust gas temperature of each time. As a result, the temperature of the NOx catalyst 21 and the like can be controlled with higher accuracy.

(16) The fuel addition valve 25 is provided to add the engine fuel (light oil) into the space downstream of the engine 10 and upstream of the NOx catalyst 21 with respect to the flow of the exhaust gas. The addition operation of the fuel addition valve 25 is controlled in S24 of FIG. 3. Thus, the temperature increase component (engine fuel) can be supplied while reducing the influence on the engine operation. As a result, the supply of the temperature increase component can be performed with high flexibility independently from the engine operation state.

(17) The addition quantity of the temperature increase component (engine fuel) added by the fuel addition valve 25 is variably controlled also in accordance with the quantity of the unburned components in the exhaust gas (mainly, HC), i.e., by subtracting the quantity of the unburned components from the target supply quantity (refer to FIG. 4A). Thus, the temperature of the NOx catalyst 21 can be controlled with higher accuracy.

(18) The catalyst diagnosis device according to the present embodiment is applied to the vehicle having the diesel engine. It is known that the exhaust temperature of the diesel engine is comparatively low (exhaust temperature during steady operation is approximately 200° C. to 300° C.). Also in the case where the diagnosis device is applied to the diesel engine, the temperature of the NOx catalyst 21 can be controlled into the diagnosis permission range more certainly through a series of processing of FIG. 3 (catalyst temperature increase processing using fuel addition valve 25).

(19) Thus, the diesel vehicle achieving higher exhaust purification performance, higher reliability of the exhaust purification performance and cleaner emission is realized.

The above-described embodiment may be modified as follows, for example.

In the above-described embodiment, the temperature control shown in FIG. 3 is repeatedly performed until S143 of FIG. 2 determines that the temperature of the NOx catalyst 21 is within the diagnosis permission range. The execution condition of the temperature control (FIG. 3) may be modified arbitrarily. For example, permission/prohibition of the execution may be set based on the engine operation state. A scheme of suspending the temperature control until the engine operation state changes (i.e., until suitable state occurs) when the temperature of the catalyst does not increase even if the temperature control (FIG. 3) is performed a predetermined time may be employed. Any scheme may be employed as long as the temperature control is performed before the catalyst diagnosis processing (FIG. 7).

In the above-described embodiment, the target addition quantity is calculated and set through processing from S21 to S24 of FIG. 3. Instead of using the oxygen concentration upstream of the catalyst with respect to the flow of the exhaust gas (and eventual addition quantity Qmax1 capable of reacting with oxygen in exhaust gas) in the setting of the fuel addition permission range (permission upper limit Qmax), the oxygen concentration may be used in the setting of the target addition quantity Qad or the target catalyst temperature TTC. Moreover, the fuel addition permission range (permission upper limit Qmax) may be set as a fixed value according to usage, e.g., in order to simplify the control.

The setting of the fuel addition permission range is not the indispensable element. For example, a map having optimal injection patterns (for example, optimum pattern obtained through experiment beforehand) corresponding to respective operating conditions decided by related parameters such as the engine rotation speed, the engine load, the exhaust temperature, the oxygen concentration and the exhaust gas flow rate may be prepared, and the target addition quantity may be set based on the map. With such the scheme, a computation load of each time is reduced after the ECU is mounted although the time and effort necessary for making the map (adaptation value sensing) increases before the ECU is mounted.

In the above-described embodiment, it is determined whether the temperature of the catalyst is in the diagnosis permission range directly based on the catalyst temperature measured by the sensor (S14 of FIG. 2). Alternatively, it may be indirectly determined whether the temperature of the catalyst is within the diagnosis permission range based on the engine operation mode and the like. For example, it may be automatically determined that the catalyst temperature is lower than the diagnosis permission range immediately after the engine start, and the temperature increase control may be started without measuring the temperature (or without obtaining temperature as measured value).

The diagnosis permission range may be a range defining a range to be removed (i.e., range defined with either upper limit or lower limit). For example, the diagnosis permission range may be set only with the lower limit when it is beforehand known that the catalyst is heated from the cooled state, e.g., before the engine warm-up (i.e., immediately after starting).

A device (for example, ambient air passage or the like) for adding the oxygen to the catalyst may be provided to promote the reaction with the temperature increase component (engine fuel) added by the fuel addition valve 25. In this case, processing also according to the supplied oxygen quantity should be preferably performed as processing corresponding to S21 of FIG. 3 (refer to also FIG. 4A).

The kind of the temperature increase component for increasing the temperature of the catalyst may be changed arbitrarily in accordance with the kind of the catalyst and the like.

In the above-described embodiment, the temperature of the NOx catalyst 21 is increased with the use of the fuel addition valve 25. Alternatively, for example, the temperature of the NOx catalyst 21 may be increased by performing air fuel ratio control (rich purge) for increasing the unburned components (mainly HC) in the exhaust gas discharged from the engine 10 like the catalyst recovery processing (FIG. 6). In this case, as an extension of the fuel injection control concerning the normal operation, the air fuel ratio of the fuel air mixture used in the combustion in the engine may be changed to the rich state. Alternatively, the fuel injection may be performed at timing delayed to such an extent that the fuel injection does not contribute to the combustion in the engine. That is, a posterior injection (for example, after injection or post-injection) may be performed after a main injection to perform multi-stage injection such that the temperature of the catalyst is increased by the unburned fuel supplied through the posterior injection. In addition, a program or the like for controlling an arbitrary heating device such as a heater may be employed. Furthermore, instead of the temperature increase control, a program for controlling an arbitrary cooling device (for example, fan or the like for cooling catalyst) may be used and the temperature of the catalyst may be controlled through the cooling control. Moreover, these methods may be combined. For example, either one or the combination of them may be selected and executed in accordance with the temperature of the catalyst or the operation range of the engine. Any scheme may be used as long as the temperature of the catalyst can be controlled into the predetermined range.

The processing mode of the catalyst recovery processing (FIG. 6) may be suitably changed according to the use and the like. For example, the catalyst recovery processing may be performed periodically (in fixed time cycle) not based on the NOx occlusion quantity. Thus, the control is simplified and the controllability is improved. Moreover, the reducing agent may be supplied to the NOx catalyst 21 by the fuel addition valve 25 like the case of the temperature control.

The processing mode of the catalyst diagnosis processing (FIG. 7) can also be suitably changed according to the use and the like. In the present embodiment, in the catalyst diagnosis processing of FIG. 7, the degradation degree of the NOx catalyst 21 is measured based on the quantity of the reducing agent required in the reduction of the occluded NOx (reducing agent consumption quantity) (S42 of FIG. 7). Alternatively, the measurement may be performed based on the time period (reduction required time period) required in the reduction of the occluded NOx, for example (like device shown in FIG. 9). In this case, there is a concern about a response delay of the A/F sensors 23a, 23b. Therefore, in order to improve the accuracy of the measurement and the degradation diagnosis, it is effective to change the rich degree (air fuel ratio) of the rich purge in accordance with the performance degradation degree of the NOx catalyst 21. In this case, the performance degradation degree can be simply measured without using the sensing signal of the A/F sensor 23a upstream of the catalyst. That is, the time period until the rich component is detected by the A/F sensor 23b downstream of the catalyst can be calculated as the reduction required time period on the basis of the start timing of the rich purge (NOx reduction control). In this case, the AF sensor may be provided only downstream of the NOx catalyst 21.

The processing of FIG. 7 may be performed only under a condition that it is assumed that the purifying performance of the NOx catalyst 21 is lowered. For example, a condition that the mileage of the vehicle reaches a predetermined mileage (for example, 10000 km) or a total quantity of the fuel injection quantity injected by the injector 11 (integration value of every fuel injection quantity) reaches a predetermined quantity may be used as the execution condition, and the catalyst degradation diagnosis processing may be performed only when the execution condition is satisfied (for example, execution flag F2 may be set at 1).

The object of the catalyst diagnosis device according to the present invention is not limited to the system according to the embodiment but may be arbitrary. That is, the scheme may be suitably changed in accordance with the use or the like. For example, the fuel addition valve 25 may be provided near the inlet (upstream side) of the NOx catalyst 21. For example, the setting positions of the DPF 20 and the NOx catalyst 21 may be reversed. A purifying device integrating the DPF 20 and the NOx catalyst 21 may be provided in the exhaust pipe 18.

Furthermore, a structure without the DPF 20 can be effectively used depending on the use. An oxidation catalyst or the like may be additionally provided downstream of the NOx catalyst 21. In place for each of the A/F sensors 23a, 23b, an O2 sensor of an electromotive force output type that outputs a binary electromotive force signal varying in accordance with the rich/lean state of the exhaust gas may be used.

Although the typical example of the NOx catalyst is shown in the embodiment, the kind of the NOx catalyst 21 is arbitrary. Presently, application of the present invention to the NOx catalyst is mainly demanded. The present invention can be applied to other uses of a structure likewise if the structure has similar temperature characteristics.

In the embodiment, the present invention is applied to the common rail system of the vehicle diesel engine as an example. Fundamentally, the present invention can be also applied to a gasoline engine (specifically, direct-injection engine) of a spark ignition type similarly.

In the embodiment and the modifications, it is assumed that various kinds of software (programs) are used when embodying the exhaust purification device according to the present invention. Alternatively, the same function may be realized by hardware such as a dedicated circuit.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust purification catalyst diagnosis device for diagnosing a degree of performance degradation of a catalyst provided in an exhaust system of an engine for exhaust purification, the diagnosis device comprising:
    a catalyst temperature determination device that determines whether temperature of the catalyst is in a predetermined diagnosis permission range before the diagnosis processing of the catalyst; and
    a catalyst temperature control device that controls the temperature of the catalyst into the diagnosis permission range before the diagnosis processing of the catalyst when the catalyst temperature determination device determines that the temperature of the catalyst is outside the diagnosis permission range,
    wherein, when the catalyst temperature determination device determines that the temperature of the catalyst is outside the diagnosis permission range, the catalyst temperature control device controls the temperature of the catalyst into the diagnosis permission range before termination of the diagnosis routine,
    wherein said temperature control by the catalyst temperature control device terminates when it is determined that the temperature of the catalyst has entered the diagnosis permission range,
    wherein said temperature control by the catalyst temperature control device is not the normal operation of the engine, but a forced change to the temperature of the catalyst, and
    wherein, when the catalyst temperature determination device determines that the temperature of the catalyst is inside the diagnosis permission range, the catalyst temperature control device does not control the temperature of the catalyst.

2. The diagnosis device as in claim 1, wherein
    the catalyst is a NOx occlusion reduction catalyst that occludes NOx contained in the exhaust gas and that performs the reduction purification of the NOx.

3. The diagnosis device as in claim 2, further comprising:
    an occlusion quantity estimation device that estimates a quantity of the NOx occluded by the catalyst per unit time; and
    a catalyst diagnosis device that performs the diagnosis processing of the catalyst based on the nitrogen occlusion quantity estimated by the occlusion quantity estimation device.

4. The diagnosis device as in claim 3, further comprising:
    a discharge start estimation device that estimates start timing of discharge of the occluded NOx from the catalyst; and
    a discharge end estimation device that estimates end timing of the discharge of the occluded NOx from the catalyst, wherein
    the occlusion quantity estimation device estimates the NOx occlusion quantity based on the discharge start timing and the discharge end timing estimated by the discharge start estimation device and the discharge end estimation device respectively.

5. The diagnosis device as in claim 4, further comprising:
    a reduction component supply device that supplies a NOx reduction component to the catalyst for performing reduction purification of the NOx occluded by the catalyst, wherein
    the discharge start estimation device estimates the start timing of the discharge of the occluded NOx from the catalyst based on air fuel ratio change of the exhaust gas upstream of the catalyst due to the supply of the NOx reduction component,
    the discharge end estimation device estimates the end timing of the discharge of the occluded NOx from the catalyst based on air fuel ratio change of the exhaust gas downstream of the catalyst due to the discharge of the NOx from the catalyst, and
    the occlusion quantity estimation device estimates the NOx occlusion quantity at timing before start of the supply of the NOx reduction component based on an integration value of a consumption quantity of the NOx reduction component during a time period from the discharge start timing estimated by the discharge start estimation device to the discharge end timing estimated by the discharge end estimation device.

6. The diagnosis device as in claim 4, further comprising:
    a reduction component supply device that supplies a NOx reduction component to the catalyst for performing reduction purification of the NOx occluded by the catalyst, wherein
    the discharge start estimation device estimates the start timing of the discharge of the occluded NOx from the catalyst based on air fuel ratio change of the exhaust gas upstream of the catalyst due to the supply of the NOx reduction component,
    the discharge end estimation device estimates the end timing of the discharge of the occluded NOx from the catalyst based on air fuel ratio change of the exhaust gas downstream of the catalyst due to the discharge of the NOx from the catalyst, and
    the occlusion quantity estimation device estimates the NOx occlusion quantity at timing before start of the supply of the NOx reduction component based on a time period from the discharge start timing estimated by the discharge start estimation device to the discharge end timing estimated by the discharge end estimation device.

7. The diagnosis device as in claim 1, further comprising:
a temperature increase device that supplies a temperature increase component to the catalyst for increasing the temperature of the catalyst with the use of reaction heat, wherein
the catalyst temperature control device controls the temperature of the catalyst into the diagnosis permission range by variably controlling a supply quantity of the temperature increase component supplied by the temperature increase device.

8. The diagnosis device as in claim 7, wherein
the temperature increase component increases the temperature of the catalyst by a reaction with oxygen, and
the catalyst temperature control device variably controls the supply quantity of the temperature increase component supplied by the temperature increase device based on an oxygen concentration of the exhaust gas upstream of the catalyst.

9. The diagnosis device as in claim 7, wherein
the catalyst temperature control device variably controls the supply quantity of the temperature increase component supplied by the temperature increase device based on an exhaust gas flow rate of the engine.

10. The diagnosis device as in claim 7, wherein
the catalyst occludes a specific component contained in the exhaust gas under an occlusion condition and purifies and discharges the occluded exhaust component under a purification condition,
the temperature increase component switches a condition concerning the occlusion and the purification of the catalyst from the occlusion condition to the purification condition if the supply quantity of the temperature increase component increases, and
the catalyst temperature control device variably controls the supply quantity of the temperature increase component supplied by the temperature increase device in a range in which the condition concerning the occlusion and the purification of the catalyst does not change from the occlusion condition to the purification condition.

11. The diagnosis device as in claim 10, further comprising:
a supply range setting device that variably sets a permission supply range concerning the supply quantity of the temperature increase component as the range in which the condition concerning the occlusion and purification of the catalyst does not change from the occlusion condition to the purification condition, wherein
the catalyst temperature control device variably controls the supply quantity of the temperature increase component supplied by the temperature increase device in the permission supply range set by the supply range setting device.

12. The exhaust purification device as in claim 11, wherein
the temperature increase component increases the temperature of the catalyst by a reaction with oxygen, and
the supply range setting device variably sets an upper limit of the permission supply range based on an oxygen concentration of the exhaust gas upstream of the catalyst.

13. The diagnosis device as in claim 11, wherein
the supply range setting device variably sets an upper limit of the permission supply range based on the temperature of the exhaust gas discharged from the engine.

14. The diagnosis device as in claim 7, wherein
the temperature increase device controls addition operation of a fuel addition valve that supplies engine fuel as the temperature increase component to a range downstream of the engine and upstream of the catalyst with respect to a flow of the exhaust gas.

15. The diagnosis device as in claim 7, wherein
the engine is a diesel engine.

* * * * *